United States Patent [19]

Streiff

[11] 3,903,275
[45] Sept. 2, 1975

[54] MEDICATED FISH FEEDS AND THE TREATMENT OF FISH DISEASES CAUSED BY BACTERIA

[75] Inventor: Konrad Streiff, Munchenstein, Switzerland

[73] Assignee: Hoffmann-La Roche Inc., Nutley, N.J.

[22] Filed: Oct. 9, 1973

[21] Appl. No.: 404,551

[30] Foreign Application Priority Data
Oct. 12, 1972  Switzerland...................... 14928/72

[52] U.S. Cl. .............................................. 424/229
[51] Int. Cl.² ...................................... A61K 31/625
[58] Field of Search ................................... 424/229

[56] References Cited
UNITED STATES PATENTS

| | | | |
|---|---|---|---|
| 3,341,541 | 9/1967 | Hoffer | 424/229 |
| 3,485,840 | 12/1969 | Hoffer | 424/229 |
| 3,515,783 | 6/1970 | Grunberg | 424/229 |
| 3,551,564 | 12/1970 | Klaui et al. | 424/229 |

OTHER PUBLICATIONS

Hoffman–La Roche – Chem. Abst. Vol. 61, (1964), page 16069f.
The Merck Veterinary Manual, 2nd edition, (1961), pages 1408 & 1409.

*Primary Examiner*—Stanley J. Friedman
*Attorney, Agent, or Firm*—Samuel L. Welt; Jon S. Saxe; Gerald S. Rosen

[57] ABSTRACT

Medicated fish feed suitable for use in the prevention and treatment of bacterial fish diseases containing as the active antibacterial agent, a pyrimidine, or pyrazine sulfonamide potentiated with a compound represented by the formula

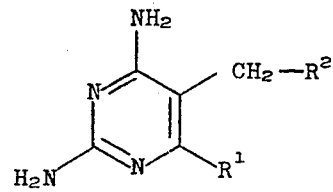

wherein $R^1$ is hydrogen or lower alkyl containing from 1 to 6 carbon atoms and $R^2$ is phenyl substituted with one or more of lower alkyl containing from 1 to 6 carbon atoms, lower alkoxy containing from 1 to 6 carbon atoms, methylenedioxy, amino, nitro, trifluoromethyl, hydroxy or halogen and methods for preventing and treating bacterial fish diseases are disclosed.

12 Claims, No Drawings

MEDICATED FISH FEEDS AND THE TREATMENT OF FISH DISEASES CAUSED BY BACTERIA

DETAILED DESCRIPTION OF THE INVENTION

Fish feeds which contain a potentiated, antibacterially active sulfonamide have been found to be useful in preventing and therapeutically treating bacterial infections in fish.

The sulfonamides found useful are pyrimidine, pyrazine or isoxazole derivatives. Typical suitable sulfonamides are 5,6-dimethoxy-4-sulfanilamido-pyrimidine, 2,4-dimethoxy-6-sulfanilamido-pyrimidine, 4,6-dimethyl-2-sulfanilamido-pyrimidine, 5-methoxy-2-sulfanilamido-pyrimidine, and 2-methoxy-3-sulfanilamido-pyrazine or mixtures thereof.

The sulfonamide potentiators useful in this invention are represented by the following formula:

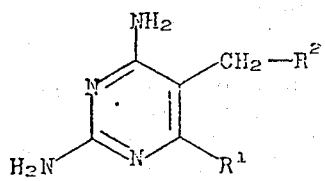

wherein $R^1$ is hydrogen or lower alkyl containing from 1 to 6 carbon atoms and $R^2$ is phenyl substituted with one or more of lower alkyl containing from 1 to 6 carbon atoms, lower alkoxy containing from 1 to 6 carbon atoms, methylenedioxy, amino, nitro, trifluoromethyl, hydroxy or halogen.

Preferred lower alkoxy substituents are methoxy and isobutoxy, the preferred lower alkyl is methyl and the preferred halogen is chlorine. The methylenedioxy substituent when present is preferably in the 3,4-position of the phenyl ring.

Especially preferred sulfonamide potentiators for use in this invention are 2,4-diamino-5-(3,4,5-trimethoxy-benzyl)-pyrimidine and 2,4-diamino-5-(3,4-dimethoxy-6-methyl-benzyl)-pyrimidine. Preferred sulfonamide/potentiator combinations are 2,4-dimethoxy-6-sulfanilamido-pyrimidine/2,4-diamino-5-(3,4,5-trimethoxy-benzyl)-pyrimidine and 4,5-dimethyl-3-sulfanilamido-isoxazole/2,4-diamino-5-(3,4,5-trimethoxy-benzyl)-pyrimidine.

The fish feed containing the antibacterially active compositions useful in this invention are produced by mixing or impregnating a feed suitable for the feeding of domestic fish by conventional means with a mixture of the potentiator and sulfonamide in powder form or in a dissolved form. The resulting product can be converted into a form suitable for feeding, e.g., by drying or pelleting.

The antibacterial fish feeds provided by the present invention are especially suitable for treating domestic fish which are bred for sport and food in special breeding stations. Carp, trout, salmon, catfish and the secondary fish which may be bred in conjunction therewith such as, for example, tench, are representative of the fish which can be treated in accordance with this invention.

The potentiated sulfonamides present in the fish feeds of the present invention are active against a number of pathogenic bacteria; for example, they are active against certain Aeromonas, Pseudomonas and Haemophilus such as *A. punctata*, *A. liquefaciens*, *A. salmonicida*, *P. fluorescens*, *P. granulata* and *H. piscium*. The fish feed compositions of the invention are especially suitable for the treatment or prevention of fish infections caused by the enumerated bacteria which primarily cause great damage in breeding stations by producing diseases such as abdominal dropsy in carp, furunculosis in salmonids or diseases of the air-bladder.

The weight ratio of the components of the active composition to one another can vary within relatively wide limits. Suitable weight ratios of sulfonamide to potentiator are 1:20 to 20:1. A preferred weight ratio range is from 1:1 to 20:1. Most preferred are weight ratios of 5:1 and 9:1.

Carriers for the potentiated sulfonamide compositions are the usual feeds used for the feeding of domestic fish; for example, mixed feeds in the form of pellets, soft feeds or spaghetti-type feeds based on cereals or other farinaceous products.

Typical mixed feeds for carp or trout are, for example, those which contain on a weight basis, a crude protein content of at least 25 or 35 percent, a crude fat content of at most 10 percent and a crude fibre content of at most 12 percent. In addition to fish and meat meal, other ingredients such as vitamins, trace elements, pressing adjuvants, oil cake, by-products of the milling industry, tapioca, molasses, dried green feed or green meal extracts are common components. The mixed feed of the aforementioned type is preferably administered in the form of pellets. The size of the pellets primarily depends on the age of the fish or brood to be fed and can go from a fine grit to 5 mm. and more in diameter. In the manufacture of a mixed fish feed, the active composition is preferably incorporated in a powdered form into the basic mixture. Usually the mixture is then heated with steam, pressed out through the matrix of a pelleting machine, cooled and subsequently packed into bags. A suitable dosage can be 10–50 mg per kg of fish per day. A preferred dosage is 20–40 mg per kg of fish per day. This dosage can be varied when the circumstances appear to make this necessary or desirable in the judgment of the veterinarian treating the fish.

The following are three typical, commercially available mixed feeds which can be used for the manufacture of the fish feeds provided by the present invention:

Mixed Feed A for Carp (Young Fish)

| Ingredients | Parts by weight |
| --- | --- |
| Fishmeal | 29.5 |
| Wheatmeal | 29.0 |
| Soybean oil meal extr. | 9.0 |
| Dried feed yeast | 3.0 |
| Tapioca meal | 4.0 |
| Lucerne green meal | 3.0 |
| Mineral substance mixture | 4.5 |
| Wheat feedmeal | 5.0 |
| Brewers grains, dried | 7.0 |
| Meat meal | 2.0 |
| Premix* | 1.0 |
| Salt | 1.5 |
| Pressing adjuvant | 1.5 |
|  | 100.0 |

Estimated content: 30.15% crude protein, 5.01% crude fat, 4.37% crude fibre.

Mixed Feed B for Trout

| Ingredients | Parts by weight |
| --- | --- |
| Wheat middlings | 31.75 |

-Continued

Mixed Feed A for Carp (Young Fish)

| Codmeal | 12.00 |
|---|---|
| Brewers grains, dried | 10.00 |
| Codliver meal | 8.00 |
| Shrimps, dried | 8.00 |
| Fishmeal | 6.00 |
| Dried feed yeast | 5.00 |
| Soybean oil meal extr. | 5.00 |
| Whale press juice, dried | 4.00 |
| Mineral substance mixture | 4.00 |
| Blood meal | 3.00 |
| Rock salt | 2.00 |
| Premix* | 1.25 |
| | 100.00 |

Estimated content: 35.23% crude protein, 5.8% fat, 7.9% crude fibre.

Mixed Feed C for Trout (Young Fish)

| Ingredients | Parts by weight |
|---|---|
| Fishmeal | 48 |
| Wheatmeal | 30 |
| Dried feed yeast | 5 |
| Soybean oil meal extr. | 5 |
| Blood meal | 5 |
| Salt | 2 |
| Mineral substance mixture | 3 |
| Premix* | 2 |
| | 100 |

Estimated content: 45.09% crude protein, 1.35% crude fibre, 7.43% crude fat.

*The premix contains, bonded to wheat middlings, per kg. of finished feed:

| Vitamin A | 15,000 I.U. |
|---|---|
| Vitamin $D_3$ | 1,500 I.U. |
| Vitamin E | 60 mg. |
| Vitamin $B_1$ | 20 mg. |
| Vitamin $B_2$ | 24 mg. |
| Vitamin $B_6$ | 10 mg. |
| Vitamin $B_{12}$ | 50 γ |
| Vitamin C | 400 mg. |
| Nicotinamide | 300 mg. |
| Pantothenic Acid | 60 mg. |

The manufacture of medicated soft feeds is accomplished in the usual manner used in trout breeding, by mixing the basic mass (meat or fish from various sources), which has been ground in a raw or cooked condition to a viscous mash, with the active composition in a floury form. A suitable dosage is about 10–1000 grams per 100 kg. of the feed. A preferred dosage is 50 grams per 100 kg. varied when in the judgment of the treating veterinarian the circumstances warrant such variation.

For carp, raised under semi-intensive conditions, maize is a preferred cereal, but rye, barley and wheat can also be used. The manufacture of medicated cereal grains for use in fish feeds is accomplished, for example, by placing 100 kg. of wheat grain in 50 liters of an aqueous solution containing the desired dose of the active composition, e.g., 50–5000 g., preferably 300 g. In about two days the cereal grains take up the aqueous solution with swelling, after which they can be fed to the fish.

The manufacture of medicated farinaceous spaghetti-type products for use in fish feeds can e.g. be accomplished by mixing 100 kg. of wheat grit with the desired dose, e.g., 100 g. to 10 kg, preferably 3 kg., of active composition in a dry form. A viscous paste is then prepared by the addition of water and kneading. The paste then is made into a suitable form by pressing out using a farinaceous product press, e.g., a cylinder of 2 mm. diameter and 4 mm. length, and is subsequently dried. The thus obtained farinaceous products containing the active composition can be given to the fish together with cereals or mixed feed pressings, for example, in the ratio 1:9 by weight.

The following trials show the use and the superior activity of the fish feeds provided by the present invention.

TRIAL 1

For a therapy trial, 1153 three-year-old carp (average weight 247 g.) which all had obvious symptoms of abdominal dropsy (medium to very severe ulcers) were selected.

On Apr. 22, 1971, the fish were distributed in three ponds:

Pond I:

Surface area: 1,700 m²
Stock: 898 carp
Feed: Mixed Feed A, medicated, ad lib. self service feed distribution.

Therapy:

3 days after introduction of the fish, they were fed for 5 days with medicated Mixed Feed A [3,000 ppm. of active ingredient consisting of 5 parts of 2,4-dimethoxy-6-sulfanilamido-pyrimidine and 1 part of 2,4-diamino-5-(3,4,5-trimethoxybenzyl)-pyrimidine].
Feed uptake/day: 3–4 percent of body weight. The uptake of active ingredient per kg. of fish in 5 days therefore amounted to 0.6 g. in 200 g. of feed.

Results:

In a fishing on Sept. 18, 1971, 825 carp were caught with an average weight of 1,070 g. In 824 of the fish all ulcers had completely healed. In 2 fish slight ulcers in the process of healing were still present. Total loss = 8 percent.

Pond II:

Surface area: 2,000 m²
Stock: 140 carp
Feed: Mixed Feed A, non-medicated

Therapy:

Single intraperitonal injection of a solution of 5 parts of 2,4-dimethoxy-6-sulfanilamido-pyrimidine and 1 part of 2,4-diamino-5-(3,4,5-trimethoxybenzyl)-pyrimidine at the beginning of the trial (3 g. of active ingredient/100 kg. of fish weight).

Results:

In a fishing on Sept. 18, 1971, 36 carp were caught with an average weight of 1,430 g. Loss = 70 percent. The treatment was consequently less effective than when the same medicament was given in the feed.

Pond III:

Surface area: 2,000 m²
Stock: 115 carp
Feed: Mixed Feed A, non-medicated

Therapy:

None

Results:

In a fishing on Sept 18, 1971, 9 carp were caught with an average weight of 1 kg. Loss = 92 percent.

TRIAL 2

Pond IV:

Surface area: 15,000 m²

Stock: In April, 10,000 two-year-old carp with an average weight of 8 g.

Feed: Mixed Feed A, ad lib. self service distribution of feed. In the beginning of June, 1971, 20 three-year-old carp which were strongly diseased with abdominal dropsy were introduced in order to infect the stock. Simultaneous strong tainting of the water in the pond was effected by very intensive manuring.

Diagnosis:

From Aug. 2nd–5th 1971, there were ca 250 losses with a diagnosis of gill rot and abdominal dropsy. In a sample fishing, abdominal dropsy ulcers were detected in 30 percent of the fish.

Therapy:

From Aug. 20th–26th 1972, the feed medicated as in Trial 1 was administered.

Results:

In a fishing on Nov. 10, 1971, there were obtained 8,842 fish of 260 g. average weight. Complete healing of all abdominal dropsy symptoms had occurred.

Trial 3

In a fish breeding station in the autumn of 1971 and spring of 1972, air-bladder inflammation broke out in seven ponds despite treatment of the carp with chloramphenicol. Fourteen days after the stocking of the ponds in the spring of 1972, the losses amounted to 10–30 percent.

Therapy:

For 5 days the feed medicated as in Trial 1 was administered (1 percent per day with respect to the body weight of the fish, i.e., a total of 150 mg. of active ingredient/kg. of fish).

Results:

The losses ceased immediately and no more diseases were observed.

I claim:

1. An antibacterial fish feed for treating fish diseases caused by bacteria containing as the antibacterially active ingredient a mixture of an antibacterially active sulfonamide selected from the group consisting of 5,6-dimethoxy-4-sulfanilamido-pyrimidine, 2,4-dimethoxy-6-sulfanilamido-pyrimidine, 4,6-dimethyl-2-sulfanilamido-pyrimidine, 5-methoxy-2-sulfanilamido-pyrimidine and 2-methoxy-3-sulfanilamido-pyrazine, and a 2,4-diamino-5-benzyl-pyrimidine sulfonamide potentiator of the formula

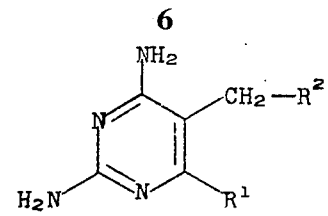

wherein $R^1$ is hydrogen or lower alkyl containing from 1 to 6 carbon atoms and $R^2$ is phenyl substituted with one or more lower alkyl containing from 1 to 6 carbon atoms, lower alkoxy containing from 1 to 6 carbon atoms, methylenedioxy, amino, nitro, trifluoromethyl, hydroxy or halogen, in a weight ratio of sulfonamide to potentiator of from 1:20 to 20:1.

2. A fish feed according to claim 1 which contains as the antibacterially active ingredient a mixture of 2,4-dimethoxy-6-sulfanilamido-pyrimidine and 2,4-diamino-5-(3,4,5-trimethoxy-benzyl)-pyrimidine.

3. A fish feed according to claim 1 wherein the weight ratio of the components of the active ingredient are from 1 to 20 parts of sulfonamide per part of potentiator.

4. A fish feed according to claim 1 wherein the weight ratio of the components of the active ingredient are 9 parts of sulfonamide per part of potentiator.

5. A fish feed according to claim 1 wherein the weight ratio of the components of the active ingredient are 5 parts of sulfonamide per part of potentiator.

6. A method of treating and preventing bacterial diseases of fish which comprises administering to fish an antibacterial feed containing the composition of claim 1 in an amount of from about 10 to 5000 grams of active ingredient per 100 kilograms of fish feed.

7. A method of treating and preventing bacterial diseases of fish which comprises administering to fish an antibacterial feed containing the composition of claim 1 in an amount of from about 30–3000 grams of active ingredient per 100 kilograms of fish feed.

8. A method of treating and preventing bacterial diseases of fish which comprises administering to fish an antibacterial feed containing the composition of claim 1 in an amount of 300 grams of active ingredient per 100 kilograms of fish feed.

9. A method of treating and preventing bacterial diseases of fish which comprises administering to fish an antibacterial feed containing the composition of claim 1 in an amount of 50 grams of active ingredient per 100 kilograms of fish feed.

10. The method of claim 6 wherein the administration is effected by feeding ad libitum.

11. A method of treating and preventing bacterial diseases of fish which comprises administering to fish sufficient amount of the composition of claim 1 to provide from about 10 to 50 mg of active ingredient per kg of fish per day.

12. A method of treating and preventing bacterial diseases of fish which comprises administering to fish sufficient amount of the composition of claim 1 to provide from about 20–40 mg of active ingredient per kg of fish per day.

* * * * *